United States Patent
Hayakawa et al.

[11] Patent Number: 5,239,397
[45] Date of Patent: Aug. 24, 1993

[54] LIQUID CRYSTAL LIGHT VALVE WITH AMORPHOUS SILICON PHOTOCONDUCTOR OF AMORPHOUS SILICON AND HYDROGEN OR A HALOGEN

[75] Inventors: Takashi Hayakawa, Nara; Shiro Narikawa, Kashihara; Kunio Ohashi, Nara, all of Japan

[73] Assignee: Sharp Kabushiki, Osaka, Japan

[21] Appl. No.: 839,732

[22] Filed: Feb. 19, 1992

Related U.S. Application Data

[63] Continuation of Ser. No. 594,973, Oct. 10, 1990, abandoned.

[30] Foreign Application Priority Data

Oct. 12, 1989 [JP] Japan ................ 1-265491

[51] Int. Cl.$^5$ .................. G02F 1/1335; G03G 15/08
[52] U.S. Cl. ........................... 359/72; 430/84
[58] Field of Search ............... 430/84; 359/72

[56] References Cited

U.S. PATENT DOCUMENTS

| | | | |
|---|---|---|---|
| Re. 33,094 | 10/1989 | Maruyama et al. | 430/84 X |
| 4,265,991 | 5/1981 | Hirai et al. | 430/84 X |
| 4,377,628 | 5/1983 | Ishioka et al. | 430/84 X |
| 4,450,185 | 5/1984 | Shimizu et al. | 427/74 X |
| 4,507,375 | 3/1985 | Hirai et al. | 430/84 X |
| 4,532,199 | 7/1985 | Ueno et al. | 430/128 |
| 4,538,884 | 9/1985 | Masaki et al. | 350/342 X |
| 4,552,824 | 11/1985 | Hirai et al. | 430/84 X |
| 4,783,149 | 11/1988 | Umeda et al. | 359/72 X |
| 4,797,299 | 1/1989 | Honda et al. | 430/84 X |
| 4,850,675 | 7/1989 | Hatanaka et al. | 359/72 X |
| 4,900,646 | 2/1990 | Senske et al. | 430/84 X |
| 4,941,735 | 7/1990 | Moddel et al. | 350/342 |
| 4,971,878 | 11/1990 | Hayakawa et al. | 430/84 |
| 5,009,977 | 4/1991 | Hayakawa et al. | 430/84 |
| 5,100,749 | 3/1992 | Narikawa et al. | 430/84 X |

FOREIGN PATENT DOCUMENTS

| | | |
|---|---|---|
| 0288910 | 11/1988 | European Pat. Off. |
| 61-86756 | 5/1986 | Japan |
| 61-86757 | 5/1986 | Japan |
| 1-277245 | 11/1989 | Japan |

OTHER PUBLICATIONS

Samuelson, et al., "Fast Photoconductor Coupled Liquid—Crystal Light Valve" *Appl. Phys. Lett.*, 34(7), Apr. 1979, pp. 450–452.

Zanzucchi, Wronski, Carlson, "Optical and Photoconductive Properties of Discharge-produced Amorphous Silicon" Journal of Appl. Phys. 48(12), Dec. 1977.

Japanese Publication No. 59-81627 "Optical Writing Type Liquid Crystal Light Bulb Element", Japanese Patent Abstracts, May 5, 1984.

Japanese Publication No. 60-263121 "Forming Method of Amorphous Silicon Film", Japanese Patent Abstracts, Dec. 26, 1985.

Japanese Publication No. 59-170820 "Optical Writing Type Liquid—Crystal Light Valve Element", Japanese Patent Abstracts, Sep. 27, 1984.

*Primary Examiner*—John S. Heyman
*Assistant Examiner*—Ron Trice
*Attorney, Agent, or Firm*—David G. Conlin; George W. Neuner

[57] ABSTRACT

A photoconductor coupled liquid crystal light valve comprising a photoconductor layer, a liquid crystal layer and electrodes for applying voltage to the layers. The photoconductive layer is made of amorphous silicon containing hydrogen and/or halogen at more than 40 at%. The photoconductive layer preferably has a resistivity of between $10^{11}$ and $10^{12}$ ohm-cm and a photonconductivity of $10^{-8}$ and $10^{-6}$ cm$^2$/V. The photoconductive layer is preferably formed by electron cyclotron resonance.

11 Claims, 2 Drawing Sheets

LIQUID CRYSTAL LIGHT VALVE WITH AMORPHOUS SILICON PHOTOCONDUCTOR OF AMORPHOUS SILICON AND HYDROGEN OR A HALOGEN

This is a continuation of copending application Ser. No. 07/594,973 filed on Oct. 10, 1990 now abandoned.

BACKGROUND OF THE INVENTION

1. Field of the Invention

This invention relates to a photoconductor coupled liquid-crystal light valve utilizing photoconductive effect of a photoconductive material and electro-optical effect of liquid crystals, and a preparation of the same.

2. Description of the Related Art

In recent years, as a memory device for optical information, a photoconductor coupled liquid-crystal light valve utilizing photoconductive effect of a photoconductive material and electrooptical effect of liquid crystals has been developed. FIG. 3 shows a basic construction of a photoconductor coupled liquid crystal light valve. The photoconductor coupled liquid crystal light valve comprises photoconductive layers 1, 1-, a liquid crystal layer 2, transparent electrodes 3, 3 sandwiching the photoconductive layers 1, 1 and the liquid crystal layer 2, a voltage applying means 4 provided with the transparent electrodes 3, 3, a reflection layer 5 interposing between one of the photoconductive layers and the liquid crystal layer, orientation films 6, 6 and glass substrates 7,7. Basic function of this device will be detailed hereunder. For convenience of explanation, the resistance value of the reflection layer 5 and orientation film 6 is assumed to be substantially lower than that of the photoconductive layer and the liquid crystal layer.

When voltage $V_0$ is applied to the photoconductive layer 1 and the liquid crystal layer 2 by the voltage applying means 4, the photoconductive layer 1 and the liquid-crystal layer 2 are imposed with the voltages in proportion to resistance of the layers 1 and 2, respectively. When light is not applied to the photoconductive layer 1, since resistance of the photoconductive layer is high, the voltage applied to the liquid-crystal layer 2 is lower than the threshold voltage VST that enables electrooptical effect. When light 8 for writing is applied in a predetermined ON/OFF pattern from the side of the photoconductive layer 1, the irradiated part of the photoconductive layer 1 decreases in resistance to make higher voltage to be applied to the corresponding part of the liquid crystal layer. In this instance, the voltage exceeds the threshold voltage $V_{ST}$ to cause a change of the layer due to electro-optical effect. The remaining part of the photoconductive layer not subjected to the irradiation does not change in resistance, so that there causes no change in the liquid crystal layer. This is the process of writing of optical information. When light is applied from the side of the liquid crystal layer 2 after the above writing of optical information, the reflection layer 5 provides a reading light 9 with a pattern of existence and non-existence of reflective light.

Such a device operation as above requires to satisfy the following formula to show a fine contrast and store a good image.

$$R_{PCi} < < R_{LC} < < R_{PCd} \tag{1}$$

wherein $R_{PCi}$ is resistance in the irradiated part, $R_{LC}$ is resistance of the liquid crystal layer, and $R_{PCd}$ is resistance in the non-irradiated part. Assuming that the photoconductive layer 1 and the liquid crystal layer 2 have a substantially equal thickness to each other, the formula (1) can be converted into a formula with specific resistance $\rho(\Omega cm)$ as follows.

$$\rho_{PCi} < < \rho_{LC} < < \rho_{PCd} \tag{2}$$

To be especially appreciated in the formulas (1) and (2) is to increase $R_{PCd}$ and $\rho_{PCd}$.

The use of amorphous silicon (called hereunder a-Si) as the above photoconductive layer has been disclosed, for example, in Japanese Unexamined Patent Publications Nos.58-34435(1983), 58-34436(1983), 58-199327(1983), 59-81627(1984) and 59-170820(1984) wherein a-Si is prepared by plasma CVD process or sputtering process, and the following methods have been used for increasing $R_{PCd}$ and $\rho_{PCd}$.

I. Boron is added to the a-Si layer to make it an intrinsic semiconductor having a high $\rho_{PCd}$.

II. A metallic material for forming a Schottky contact with respect to the photoconductive layer is used in a translucent form as a transparent electrode to be in contact with the photoconductive layer for making higher nominal specific resistance of the a-Si layer, to which the transparent electrode is applied an inverse bias to substantially increase $\rho_{PCd}$.

III. The thickness of a-Si layer is made larger to increase $R_{PCd}$.

The photoconductor coupled light valve prepared by the above manners I to III has the following problems.

I. Even when boron is doped, $\rho_{PCd}$ is about $10^{10}$ to $10^{11}$ $\Omega cm$ and the selective range of liquid crystal is limited to those of specific resistance $\rho_{LC}=10^{11}\Omega cm$ or lower. Also, various documentations show that when boron is doped to photoconductive layer, its photosensitivity is deteriorated, so that liquid crystal layer corresponding to the part subjected to irradiation with light is hard to be applied with sufficient voltage, leading to low in switching speed (for providing electro-optic effect) and causing no switching of liquid crystal layer, in turn, no operation of device.

II. The current excited by the photoirradiation becomes hard to flow and nominal photosensitivity is deteriorated, leading to the problems as referred to in the item I. Also, the electrode is made of a metallic material for forming Schottky contact, so that the light-transmittance lowers to affect the property of the optical information writing device. Furthermore, such a device is to be used only in direct current mode for maintaining Schottky contact.

III. Conventionally, plasma CVD process was extensively used for the deposition of the a-Si layer. Depositing speed in the process is very slow, so that it takes longer time for formation of thicker deposition, leading to a raised cost.

Also, deposition according to plasma CVD process or sputtering process allows the production of an polymeric powder of $(SiH)_n$ which adheres to a surface of substrate in the process of deposition to create defects in the deposited layer.

The present invention has been accomplished to overcome the above problems. An object of the invention is to provide a photoconductor coupled liquid crystal light valve of good property with a wider selective range of liquid crystal, by improving specific resistance of the photoconductive layer. An another object of the invention is to provide a photoconductor coupled liquid crystal light valve and a preparation of the same enabling prevention of an increase of cost to produce of the device.

The preparation of an amorphous silicon layer according to electron cyclotron resonance process (ECR process) has been disclosed, for example, in U.S. Pat. No. 4532199. However, any disclosure on the application of the amorphous silicon layer prepared by ECR process for a photoconductive layer in the photoconductor coupled light valve is not at all known in the art.

SUMMARY OF THE INVENTION

According to the present invention, there is provided a photoconductor coupled liquid crystal light valve which comprises a photoconductive layer, a liquid crystal layer and a voltage applying means for applying voltage to these layers, the photoconductive layer being made of an amorphous silicon containing hydrogen and/or halogen at 40 at% or more.

In the photoconductor coupled liquid crystal light valve of the present invention, the photoconductive layer exhibits a higher dark resistivity in comparison with the conventional a-Si layer, resulting in a higher switching speed and an excellent display contrast.

The photoconductive layer defined as above, namely an amorphous silicon layer having a hydrogen and/or halogen content of 40 at.% or more and such properties conformable for liquid crystal light valve, is never prepared by the customary process for a-Si but can be formed by deposition according to ECR process.

Hence, the present invention provides a process for preparing a photoconductor coupled liquid crystal light valve comprising a photoconductive layer, a liquid crystal layer and a voltage applying means for applying voltage to these layers, wherein the photoconductive layer is formed by electron cyclotron resonance (ECR) process.

According to the present preparation process, there causes no production of powdery $(SiH_2)_n$ as aforesaid under the formation step of the photoconductive layer thereby preventing occurrence of defects in the deposited layer. Further, the formation of the photoconductive layer can be effected with a higher deposition rate and gas utilizing efficiency, leading to cost reduction.

DETAILED DESCRIPTION OF THE PREFERRED EMBODIMENTS

The present invention has been achieved on the basis of the discovery of such facts that an a-Si layer having a hydrogen and/or halogen content of more than 40 at% with good quality can be prepared according to ECR process, and the application of the a-Si layer as a photoconductive layer in photoconductor coupled liquid crystal light valve can provide a light valve exhibiting an excellent switching property and high contrast due to high resistivity of the photoconductive layer.

It is the recognition of a person skilled in the art that according to the conventional preparation method of a-Si such as plasma CVD profess or sputtering process as disclosed in the prior publications referred to at RELATED ART, the a-Si formed is judged from it's resistivity to have a hydrogen and/or halogen content of less than 40 at% and at most about 20 at%. This can be proved by the data disclosed, for example, in M.H. Brodsky et.al, Applied Physics Letters Vol.30, No.11, June 1977, p561-, and P.J.Zanzucchi, et. al, J.Applied Physics Vol 48,No.12, December, 1977, p5227, wherein demonstrated that the a-Si layer formed by the conventional plasma CVD process inevitably contains hydrogen less than 40 at%, and that for providing sufficient photoconductivity, the substrate temperature upon depositing is to be set higher than 200° C., resulting in a hydrogen content of less than 20 at% in deposition.

The use of electron cyclotron resonance process enables the total content of hydrogen and halogen in the a-Si layer formed to be 40 at% or more. The inventors has found that the a-Si layer formed by ECR process having a total content of hydrogen and halogen of 40 at% or more shows a higher resistivity $\rho_{PCd}$ as $10^{11-12}\Omega cm$ without doping of boron and a good property of normalized photoconductivity as $10^{-8}(cm^2/V)$. Hence, when the a-Si is used for the production of the photoconductor coupled liquidcrystal light valve, it provides a higher resistivity of a-Si layer as by the process I, and there causes no problems involved in the aforesaid processes II and III. Further, since the resistivity $\rho^{FCd}$ is higher as $10^{11-12}\Omega cm$, a wider range of selection of liquid crystals is provided. Also, there is no lowering of photosensitivity of the layer due to no doping of boron.

Also, according to ECR process, there causes no polymeric powder in the deposition to prevent occurrence of defects in the deposited layer.

Specific preparation methods of the a-Si layer according to ECR process will be detailed.

Figure 2:
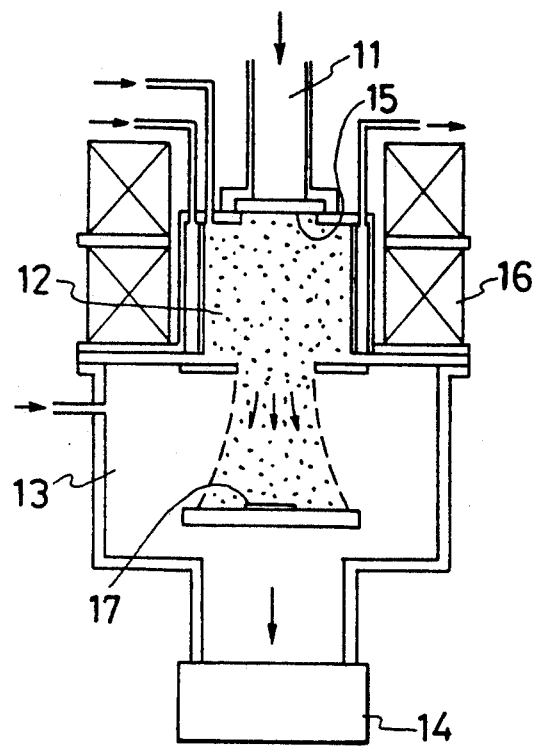
FIG. 2 is a sectional view showing a structure of depositing apparatus according to ECR process.

First referred to is a structure of a-Si depositing apparatus according to ECR process. FIG. 2 shows a structure of ECR depositing apparatus which comprises a microwave guide 11, a plasma generation chamber 12, a deposition chamber 13, and a exhaust system 14. The plasma generation chamber 12 comprises cavity resonator, and to which microwave is introduced through waveguide 11. A window 15 for introducing microwave is made from quartz glass through which microwave easily passes. A magnetic coil 16 is disposed around the plasma generation chamber 12 to apply divergent magnetic field to the plasma generation chamber 12, so that plasma generated is drawn into the deposition chamber 13. A substrate 17 which is to be laid in the deposition chamber 13 comprises a glass substrate 7 transparent in relation to the writing light 8 and transparent electrodes 3 laminated over the substrates 7.

The deposition (film formation) is conducted in such manner that the plasma generation chamber 12 and the deposition chamber 13 are evacuated by the exhaust system 14, then, a material gas is introduced into the chambers. Specific examples of the material gases include silicon compounds having either hydrogen or halogen or both of them such as $SiH_4$, $Si_2H_8$, $SiF_4$, $SiCl_4$, $SiHCl_3$, $SiH_2Cl_2$, the silicon compounds being used solely or in combination to be introduced into the deposition chamber 13. After the introduction of the gas, microwave is guided into the plasma generation chamber 12 with gas pressure being kept at a predetermined value, and magnetic field is applied to the chamber 12 to excite plasma. The material gas subjected to plasma is directed to the substrate through the divergent magnetic field to deposit an a-Si layer on the substrate. In this embodiment, the substrate is not heated. A window 18 for drawing out plasma may be adjusted in positions and size to improve uniformity of deposition.

In the preparation method of the present invention, it is preferable that output of the above microwave be 1.0 to 5.0 Kw, material gas flow be 50 to 250 sccm, and the gas pressure under deposition be 2.0 to 20 mTorr measured by means of the ion gauge. Also, the thickness of deposited layer is preferably 0.5 to 10 μm.

Figure 1:
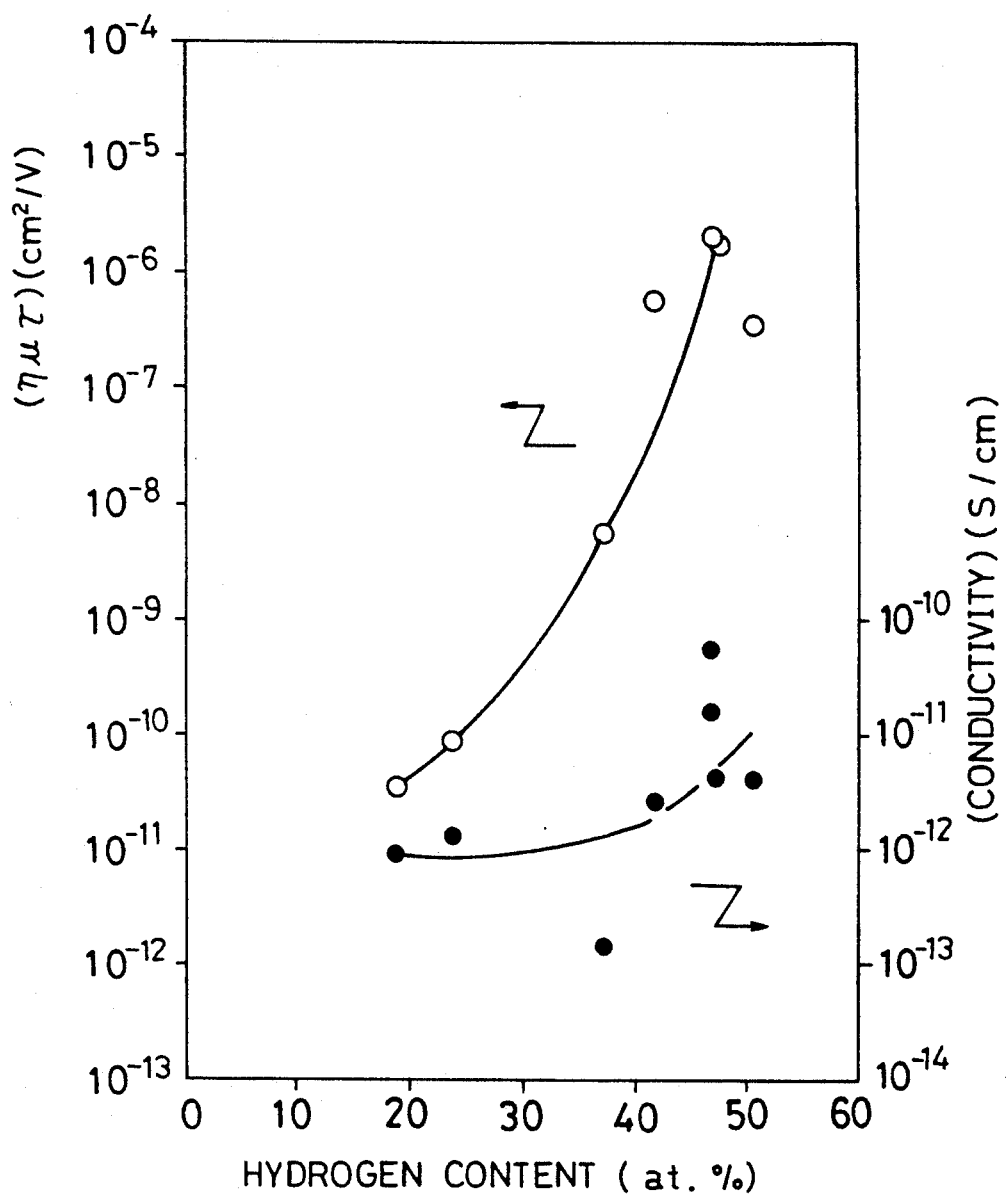
FIG. 1 is a diagram showing a relationship of hydrogen content in the deposited photoconductive layer with dark conductivity and normalized photoconductivity $\eta\mu\tau$.

The a-Si layer formed by use of the depositing apparatus constructed as above was confirmed to exhibit a excellent property. FIG. 1 is a diagram showing a relationship between the hydrogen content in a-Si layer formed with using SiH4 as a material gas and at various gas pressure and the dark conductivity (inverse of specific resistance) and normalized photoconductivity ($\eta\mu\tau$) thereof. The hydrogen content (or halogen content) in the layer depends on the pressure of material gas upon depositing.

As seen from FIG. 1, when the hydrogen content is set to be 40 at% or more, the a-Si layer exhibits a good photoconductivity with high resistivity of $10^{11-12}$ Ωcm and $\eta\mu\tau$ of $10^{-8}$ to $-7$ cm$^2$/V. This means that the part not subjected to the light irradiation shows sufficiently high resistance and those subjected to the irradiation fully decreases resistance (exhibiting good photosensitivity). In other words, this provides a good contrast in image by the application of the writing light.

For making higher resistivity, it is considered that the hydrogen content in a-Si layer be lowered. However, in this case, the photoconductivity $\eta\mu\tau$ shows an unfavorable value as $10^{-9}$ to $-10$ cm$^2$/V as seen in FIG. 1, so that such a device of the a-Si layer is not at all suitable as a photoconductive layer for a photoconductor coupled liquidcrystal light valve. Hence, it will be appreciated that a-Si layer as a photoconductive layer of the photoconductor coupled liquidcrystal light valve is required to have a hydrogen content of 40 at% or more.

Such an a-Si layer having the high hydrogen content and showing the favorable photoconductive property is, as referred to as above, not able to be prepared by the customarily used plasma CVD process, but can be obtained by ECR process. Thus, it is considered that the conventional a-Si layer and that of the present invention is quite different in bonding configuration of Si atom with hydrogen atom, so that the a-Si deposition of the present invention can exhibit a favorable photosensitivity with containing much hydrogen.

Additional merits in the use of ECR process will be detailed.

(1) In the formation of the a-Si layer by plasma CVD process or sputtering process, (SiH2)n powder is inevitably created to adhere to the substrate, causing defects in the layer. In turn, ECR process does not cause such a powder to avoid creation of defects in the layer.

(2) In comparison with the case according to plasma CVD process and the like, 6 to 10 times of preferable depositing rate and gas utilizing efficiency was achieved, particularly under the gas pressure (2 to 3.5 mTorr) capable of providing the hydrogen content of 40 at% or more. Noted that, in the case of plasma CVD process, the photosensitivity of the deposited layer is to be usually deteriorated under the condition allowing such a higher depositing rate.

As aforementioned, ECR process is quite suitable for depositing an a-Si layer.

The above explanation refers to as the material gas a SiH4 and therefore hydrogen is only to be contained in the a-Si layer. A similar effect was also developed by depositing the a-Si layer containing a halogen in place of hydrogen. That is, a total content of hydrogen and halogen can be 40 at% or more. When the total content of hydrogen and halogen was set to be 65 at% or more, the optical bandgap of the deposited layer becomes much larger and such a deposited layer is not suitable as a photoconductive layer of the photoconductor coupled liquid crystal light valve. Specifically, a total content of hydrogen and halogen is preferably 40 to 65 at% and more preferably 40 to 55 at%.

Figure 3:
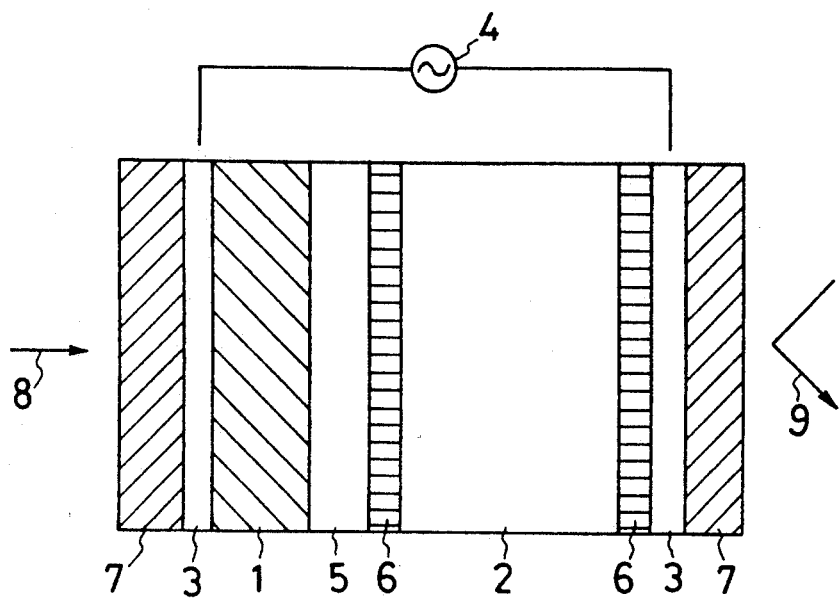
FIG. 3 is an explanatory view showing a structure of photoconductor coupled liquid crystal light valve.

As far as the photoconductive layer as above is employed, various structures and materials known in the art can be applied for completing the photoconductor coupled liquid crystal light valve of the invention. For example, such a known liquid crystal layer as a twisted nematic liquid crystal layer, a ferroelectric liquid crystal layer or an antiferroelectric liquid crystal layer may be applied as the liquid crystal layer of this invention. Also, the voltage applying means may comprise a transparent conductive layer, such as ITO and a metallic layer in combination with an external power source. Further, the liquid crystal layer may be sandwiched between a pair of orientation layers, or provided at one side with a reflection layer. These layers may be supported as sandwiched between a conventionally used pair of transparent substrates. A preferable embodiment in this regard is as shown in FIG. 3.

EXAMPLE

Next, an example of preparation of the photoconductor coupled liquidcrystal light valve of the present invention will be referred to.

| (Materials) Substrate | Glass |
|---|---|
| Transparent electrode | Deposition of ITO (InTiO) on the glass substrate |
| Photoconductive layer | a-Si layer of 1 μm thickness deposited under the condition of SiH4 flow at 120 sccm, magnetic coil current 17A, microwave output 2.5 Kw, Gas pressure 2.6 m Torr, hydrogen content of 48 at %. |
| Reflection layer | lamination of various material layers of different reflectivities. thickness of the lamination is 0.05 to 0.1 μm. Specifically, the reflection layer is a dielectric mirror formed by laminating 10 to 15 layers of MgF—Zns, Si—SiO2 and the like. Preferable in the present invention is the combination Si—SiO2 to prevent a photoconductive layer from being polluted by any atoms other than Si. |
| Orientation layer | Silane reagent is coated on the reflection layer and given high temperature treatment. |
| Liquid crystal layer | Liquid + crystal of 7 to 8 μm was formed by mixing chiral reagent (cholesteric nonanoate and the like) of 7 to 8 wt % with phenylcychlohexane liquid crystal. The liquid crystal layer has twisting pitch of about 20% of thickness. |

In the prepared photoconductor coupled liquidcrystal light valve (FIG. 3), an electric field of 1 K Hz, 6 V was applied between the transparent electrodes 3, 3 by the voltage applying means 4 and a writing light 8 was applied. The liquid crystal layer changed from transparent to translucent and milk-white. The state was kept after stoppage of writing to reveal that photo information was written in the liquid crystal layer. Deletion of the photo information was carried out by application of AC voltage of 10 V.

As the liquid crystal layer, those of specific resistance of $10^{11-12}(\Omega cm)$ or more may be used other than that used herein, so that the allowance in selectivity of the liquid crystal material is broader than that for the conventional liquid crystal light valve.

What is claimed is:

1. A photoconductor coupled liquid crystal light valve comprising a photoconductive layer, a liquid crystal layer and a voltage applying means for applying voltage to the layers, the photoconductive layer being made of amorphous silicon containing hydrogen and/or halogen at more than 40 at% and said layer having a photonconductivity $\eta\mu\tau$ of $10^{-8 \text{ to} -7}$ cm$^2$V.

2. The liquid crystal light valve of claim 1 in which the content of hydrogen and/or halogen is from over 40 at% to 65 at%.

3. The liquid crystal light valve of claim 1 in which the content of hydrogen and/or halogen is from over 40 at% to 55 at%.

4. The liquid crystal light valve of claim 1 in which the photoconductive layer has a thickness of 0.5 to $10^{-}\mu m$.

5. The liquid crystal light valve of claim 1 in which the voltage applying means comprises a pair of transparent conductive layers sandwiching the photoconductive layer and the liquid crystal layer.

6. The liquid crystal light valve of claim 5 in which a reflection layer is interposed between the photoconductive layer and the liquid crystal layer.

7. The liquid crystal light valve of claim 5 further comprising a pair of orientation layers sandwiching the liquid crystal layer.

8. A photoconductor coupled liquid crystal light valve having a photoconductive layer, a liquid crystal layer and a voltage applying means for applying voltage to the layers, the photoconductive layer is formed of amorphous silicon by electron cyclotron resonance process to include hydrogen and/or halogen at 40 at% or more such that said photoconductive layer has a dark resistivity of $10^{11-12}\Omega cm$ and a photoconductivity $\eta\mu\tau$ of $10^{-8 \text{ to} -7}$ cm$^2$/V.

9. A photoconductor coupled liquid crystal light valve comprising a photoconductive layer, a liquid crystal layer and a voltage applying means for applying voltage to the layers, the photoconductive layer being made of amorphous silicon containing hydrogen and/or halogen at 40 at% or more and said layer having a dark resistivity of $10^{11-12}$ $\Omega cm$ and a photoconductivity $\eta\mu\tau$ of $10^{-8 \text{ to} -7}$ cm$^2$/V.

10. A photoconductive coupled liquid crystal light valve having a photoconductive layer, a liquid crystal layer and a voltage applying means of applying voltage of the layers, the photoconductive layer is form of amorphous silicon by electron cyclotron resonance process using microwave of 1.0 to 5.0 Kw. to include within the photoconductive layer hydrogen and/or halogen at 40 at.% or more such that said photoconductive layer has a dark resistivity of $10^{11-12}\tau cm$ and a photoconductivity $\eta\mu\tau$ of $10^{-8}$ to $10^{-67}$ cm$^2$/V.

11. A photoconductor coupled liquid crystal light valve having a photoconductive layer, a layer, a liquid crystal layer and a voltage applying means or applying voltage to the layers, the photoconductive layer is form of amorphous silicon by electron cyclotron resonance process conducted under a material gas pressure of 2.0 to 20 mTorr to include within the photoconductive layer hydrogen and/or halogen at 40 at% or more such that said photoconductive layer has a dark resistivity of $10^{11-12}\Omega cm$ and a photoconductivity $\eta\mu\tau$ of $10^{-8}$ to $10^{-6}$ cm$^2$/V.

* * * * *